Figure 1:
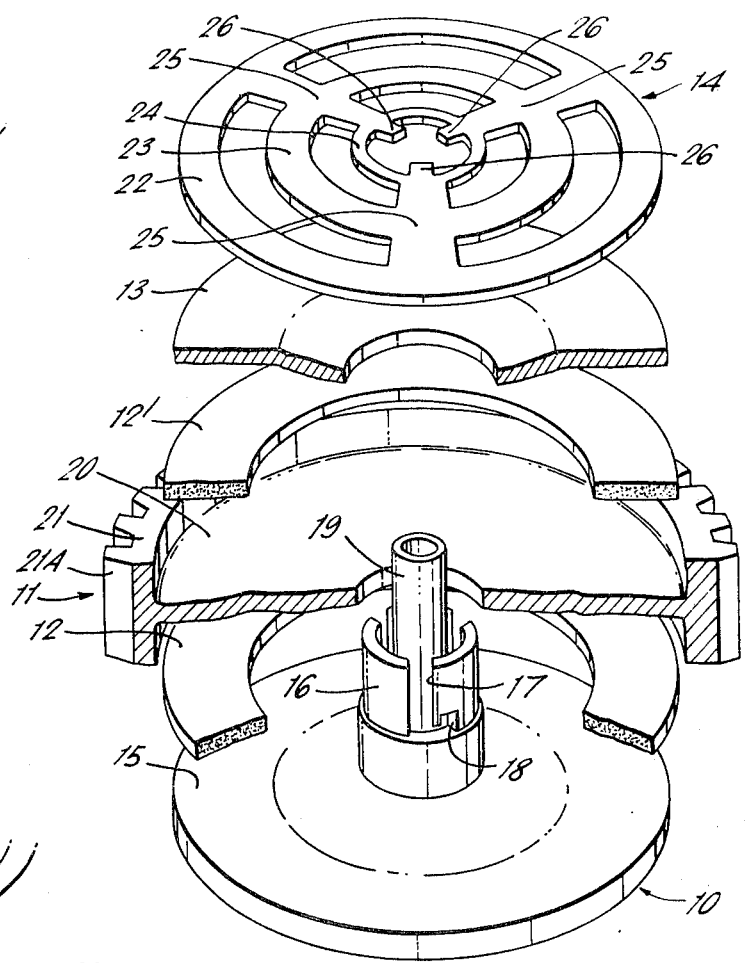

United States Patent [19]

Tuninetti

[11] 4,043,149
[45] Aug. 23, 1977

[54] UNIFORM-LOAD CLUTCH DEVICE PARTICULARLY ADAPTED FOR APPLICATION IN MAGNETIC-TAPE RECORDERS

[75] Inventor: Domenico Tuninetti, Rome, Italy

[73] Assignee: SPEM: Societa Prodotti Elettronici Meccanici, Rome, Italy

[21] Appl. No.: 647,520

[22] Filed: Jan. 8, 1976

[30] Foreign Application Priority Data

Jan. 15, 1975 Italy ................................ 47700/75

[51] Int. Cl.² .......................................... F16D 7/02
[52] U.S. Cl. .................................. 64/30 C; 64/15 R; 251/337; 403/349
[58] Field of Search ............... 64/30 R, 30 C, 30 D, 64/15 R, 15 B; 251/337; 403/349

[56] References Cited

U.S. PATENT DOCUMENTS

| 2,110,136 | 3/1938 | Douglas | 403/349 |
| 2,857,750 | 10/1958 | Fox | 64/30 C |
| 2,933,711 | 4/1960 | Eaton | 403/349 |
| 3,681,940 | 8/1972 | Albrile | 64/30 C |

Primary Examiner—Samuel Scott
Assistant Examiner—Randall Heald

[57] ABSTRACT

Uniform load clutch device for transmitting a motion from a driving member to a driven member while permitting friction slippage between the two members should the driven member be stopped, wherein the driving member has a cylindrical part on which are freely mounted first and second friction pads with the driven member interposed therebetween, and resilient biasing means mounted on said cylindrical part and locked thereon in operational position exerting a force to bring into firm engagement said members and friction pads, whereby no relative movement will take place between said resilient biasing means and said driving member during the transmission of said motion.

6 Claims, 3 Drawing Figures

U.S. Patent   Aug 23, 1977   4,043,149

UNIFORM-LOAD CLUTCH DEVICE PARTICULARLY ADAPTED FOR APPLICATION IN MAGNETIC-TAPE RECORDERS

This application relates to a uniform-load clutch device and particularly to such a device adaptd to be applied to magnetic-tape recorders.

Such devices are utilized for transmitting a torque from a driving member to a driven member in such a way that, even when, for any reason, the driven member stops, the driving member can keep rotating freely owing to a slipping action on a felt pad.

All clutch devices of this kind now available on the market are not satisfactory as they cannot assure a load which is uniform with time and therefore, as the time goes on, they suffer from the drawback of jerking. This results from the structural concepts of said devices, irrespectively of the manufacturing accuracy thereof. Indeed, devices of this kind usually comprise two rotating discs forced against a felt pad by a loading spring, which spring loads its reaction on a stationary abutment and therefore the abutment friction is added to the clutch load, due to the reaction of the loading spring biasing the two disks against the felt pad. This friction is generated as the abutment is stationary while the loading spring is rotating together with the two disks and felt pad. Consequently, this abutment, as the time goes on is subjected to surface discontinuity independently from manufacturing accuracy, for instance owing to the interposition of foreign matter, as dust or motes.

In the clutch device of the invention there is no friction between the loading spring and the abutment supporting the loading spring with a resulting impossibility of load discontinuity, even after a long use.

Moreover, the arrangement of this clutch device allows to utilize the spring reaction in order to double the slipping surface, due to a second felt pad, with a resulting doubling of the device life with equal slipping surface or a halving of the slipping surface with equal life.

Accordingly, it is a main object of this invention to provide a clutch device particulary adapted to be used in cassette-type tape recorders based on a new conception, wherein the friction of the spring against the abutment is avoided, thus eliminating any load discontinuity.

It is another object of this invention to provide a clutch device of the kind set forth wherein the slipping surface is doubled so that the life of the device is accordingly doubled.

According to the invention a sleeve is rigidly connected with one rotating member (driving or driven) on which member are fitted sequentially a first felt pad, the other member (driven or driving), another felt pad, an intermediate disk and then the spring which is a disk spring. Moreover, on the spring and the sleeve, bayonet joint means is formed which allows the spring to be fastened on the sleeve in the assembled condition where the spring is exerting its load, which is a uniform load, on the other parts forming the device, so that the driving member torque can be transmitted to the driven member.

Figure 3:
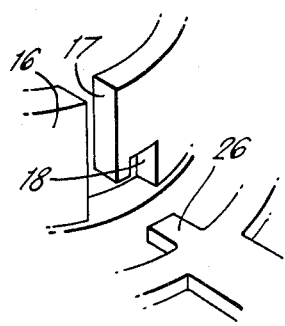
Figure 2:
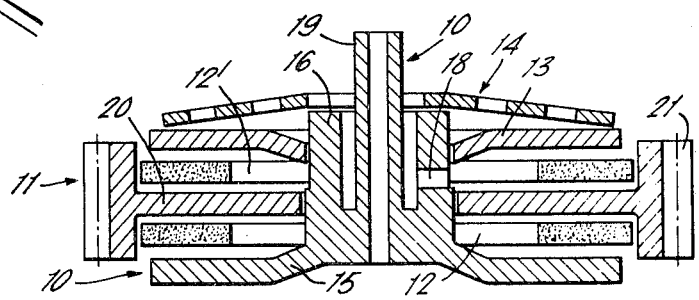

This invention will be now more particularly described with reference to the accompaining drawing, wherein:

FIG. 1 is a perspective view, with part partially cut away for clearness, showing the device of the invention FIG. 2 is an axial section of the device assembled but not fastened, and FIG. 3 shows an enlarged view of a detail illustrating the bayonet joint fastening the spring element of the device.

With particular reference to FIGS. 1 and 2, the device of the invention comprises substantially: a driving member 10; a driven member 11, two identical felt friction pads 12, 12', of flat annular configuration, an intermediate element 13 and a disk-type spring 14.

Driving member 10 has a mounting or abutting disk-shaped base 15; a cylindrical part or sleeve 16 and a shaft 19 of a lesser diameter concentric with sleeve 16 having an open top and a number of L-shaped slots 17, preferably three, angularly spaced apart 120° from each other, formed thereon, each slot including a long portion parallel to the sleeve axis and a short portion perpendicular thereto having an indentation at 18.

Driven member 11 comprises a centrally open disc 20 and a peripheral annular flange 21, to which a crown gear 21A is rigidly connected or integral, so that driven member 11 shows a cross-section of double T shaped.

Disk spring 14 of a resilient metal is preferably slightly cup-shaped as shown in the drawing and comprises three concentric rings 22, 23 and 24 connected by three radial arms 25 circumferentially spaced apart 120° from each other, each arm 25 extending beyond innermost ring 24 to form a radially protruding tooth 26.

Assembling of the parts that form the device of the invention is easily and simply carried out, fitting in sequence on cylindrical sleeves 16 and 19 of driving member 10, first felt pad 12, driven member 11, second felt pad 12', intermediate annular member 13 and then disk spring 14. Teeth 26 of spring 14 fit in slots 17 and, when they reach the bottom thereof, spring 14 is slightly rotated, counterclockwise in FIG. 1, about its own axis so that teeth 26 enter in the short portion of L-shaped slots 17 and at last, due to resilience of cup shaped spring 14, they resiliently engage indentations 18. In the assembled and locked position, the cupshape of spring 14 press in firm reciprocal engagement all the device parts that are clamped between spring 14 and base 15 of driving member 10, so that the torque of driving member 10 is transmitted, through the upper face of base 15, intermediate annular member 13, and annular felt pads 12 and 12', to disk portion 20 of driven member 11 with a uniform load, which load will not change with time. In use, the torque applied to cylindrical part 19 by a driving shaft connected thereto, (not shown) is transmitted to driven member 11 and taken therefrom by a gear (not shown) meshed with crown gear 21A. Should driven member 11 be compelled to stop, driving member 10 will keep on rotating, with a slipping action on felt pads 12 and 12'.

It will be evident that the device of the invention, which has been described and illustrated by way of example as applied to a cassette-type tape recorder, can be utilized as a clutch device to transmit a torque from any driving members to any driven members.

Moreover, such a device, suitably modified, can be used to transmit a translating motion from a driving member to a driven member, where there is the necessity of interposing one or more felt pads between the driving member and the driven member in order to allow a relative movement owing to a slipping of the driving member in respect of the driven member, where the latter is compelled to stop.

I claim:

1. A uniform load clutch device for transmitting a motion from a driving member to a driven member while permitting friction slippage between the two members should the driven member be stopped, wherein one of said members has a circular base and a first cylindrical part for receiving and guiding the other member, and there is provided first and second flat annular felt friction pads freely mounted on said first cylindrical part with said other member interposed therebetween and resilient biasing means mounted on said first cylindrical part for exerting a force to bring into firm engagement said members and friction pads, said first cylindrical part having a number of L-shaped slots, each slot comprising a long portion parallel to the direction of the base axis and a short portion perpendicular thereto having a bayonet-joint indentation, said slots cooperating with matching locking means on said resilient biasing means to lock said resilient biasing means in operational position on said one member, so that the reaction thereof will unload on said slots of said one member, and therefore no relative movement will take place between said resilient biasing means and said one member during the transmission of said motion, and a second cylindrical part concentric to said first cylindrical part of a lesser diameter and a longer length than said first cylindrical part.

2. The device of claim 1, wherein said other member is an annular member having a flat part with two annular parallel surfaces and a central opening, suitable to be fitted on said first cylindrical part between said first flat annular felt pad, engaging the upper face of said base of said one member, and said second flat annular felt pad.

3. The device of claim 2 wherein said resilient biasing means is an annular cup-shaped member of a suitable resilient material having a central opening of a diameter larger than said first cylindrical part and a number of teeth equal to said L-shaped slots inwardly protruding in said central opening, each tooth being adapted to fit in a corresponding slot and to be received and locked, against axial movements, in said indentation through a slight rotation of said annular cup-shaped member when each tooth has reached the bottom of the corresponding L-shaped slot, said resilient cup-shaped annular member being fitted on said first cylindrical part over said second flat annular felt pad.

4. The device of claim 3, wherein an annular flat member of a rigid material is fitted on said first cylindrical part between said resilient cup-shaped annular member and said second flat annular felt pad.

5. The device of claim 1, wherein said one member is the driving member.

6. The device of claim 2, wherein said other member is the driven member.

* * * * *